ELECTRICAL DETECTING MEANS

Original Filed Feb. 17, 1967 3 Sheets-Sheet 1

INVENTOR.
LINCOLN H. CHARLOT, JR.
BY
Carpenter, Kinney & Coulter
ATTORNEYS

ELECTRICAL DETECTING MEANS

Original Filed Feb. 17, 1967 3 Sheets-Sheet 2

INVENTOR.
LINCOLN H. CHARLOT, JR.
BY
Carpenter, Kinney & Coulter
ATTORNEYS

INVENTOR.
LINCOLN H. CHARLOT, JR.
BY
Carpenter, Kinney & Coulter
ATTORNEYS

United States Patent Office

Re. 27,064
Reissued Feb. 16, 1971

27,064

ELECTRICAL DETECTING MEANS

Lincoln H. Charlot, Jr., Tampa, Fla., assignor to Minnesota Mining & Manufacturing Company, St. Paul, Minn., a corporation of Delaware Original No. 3,407,403, dated Oct. 22, 1968, Ser. No. 616,924, Feb. 17, 1967. Application for reissue July 24, 1969, Ser. No. 853,560
Int. Cl. G01s *9/42*
U.S. Cl. 343—7.5 16 Claims

Matter enclosed in heavy brackets [ ] appears in the original patent but forms no part of this reissue specification; matter printed in italics indicates the additions made by reissue.

ABSTRACT OF THE DISCLOSURE

An electrical detecting apparatus utilizing a frequency shifting oscillator for generating a radio frequency signal which is transmitted by a radiating means in a propagated wave and intercepted by a target resulting in a reflected wave which is detected by a receiving means wherein the received reflected wave is used to shift the oscillator operating frequency for indicating target detection by a Doppler frequency shift is shown.

Use of electrical detecting apparatus for sensing moving objects is known. Certain types of known detectors, such as the devices of Patents Nos. 3,210,752 and 3,242,-486, employ an oscillator which establishes a fixed operating frequency for the detector oscillator. Such detectors sense the presence of a moving object by use of antennas which transmit a continuous wave radio frequency signal.

In Patent No. 3,210,752, for example, the moving object interrupts the field and causes reflected waves to be directed back to the same antenna transmitting the radio frequency signal whereby a detected signal having an amplitude which is a function of the reflected wave is produced. The amplitude and phase of the transmitted radio frequency signal are compared to the amplitude and phase of the detected signal and the difference therebetween is utilized directly as a means for detecting the presence of a moving object.

In Patent No. 3,242,486, for example, a radio signal having a fixed frequency is radiated as a continuous wave in a preselected area. A moving object intercepts the continuous wave and causes a portion of the continuous wave to be directed back to a separate antenna and detecting circuit. The detecting circuit also has a part of the radio signal at a fixed frequency applied thereto from the radiating means. The detecting circuit mixes the fixed frequency signal with the received signal and produces an output signal which changes as a function of the difference between the radiated and received frequency, which frequency is the Doppler frequency. Additionally, the amplitude of the Doppler frequency signal varies directly in proportion to the amplitude of the received signal. After the Doppler frequency signal (which is in the kilocycle range) is generated, it is applied to a discriminating circuit which actuates an alarm device if the amplitude of the Doppler frequency signal exceeds a predetermined level.

In these types of devices, it is essential that a stable oscillator be used in that the output signal has a fixed amplitude, phase and frequency. Further, electrical sensing apparatuses of the prior art are not self-detecting in that the operational characteristics of the circuit do not change and an external detector is necessary to detect the moving object.

Another type of electrical detecting apparatus, disclosed in Patent No. 3,201,774, utilizes an oscillator having a tank circuit under control of a feedback circuit having an additional resonant circuit. The additional resonant circuit controls the state of the oscillator, viz, whether the oscillator is in oscillation or disabled. The oscillator frequency is determined by the tank circuit and the pick-up device is either the capacitance or inductance component of the resonant circuit.

The electrical detecting means of the present invention provides a substantial improvement over the prior art devices. The improvement resides in a sensitive electrical sensing apparatus which is responsive to a feedback signal which varies in phase, which may or may not be a time related variance, to change the operating frequency of an oscillator as a function of target detection.

In one embodiment of the present invention, an oscillator having a resonant circuit produces a radio frequency signal at the frequency of the resonant circuit when a feedback signal having a predetermined phase generated within a feedback network, is applied to the oscillator. The radio frequency signal, at this resonant frequency, is transmitted by a first antenna into an area or space to be monitored. A propagated wave is established having a radiation pattern which depends on the environmental conditions of the monitored spaced and characteristics of the first antenna. A second antenna, which is electrically coupled to the feedback network, receives reflected waves, the phase and magnitude of which are dependent upon the environmental conditions in a manner similar to the first antenna. When a target enters the space monitored by the electrical detecting means, the target intercepts the propagated wave radiation pattern causing a reflected wave which is received by the second antenna.

The second antenna, in response to the reflected wave, applies a signal representative of the reflected wave to the feedback network. The feedback network produces a feedback signal having a new phase which is determined by the reflected wave sensed by the second antenna. The feedback signal, having a new phase, is combined with or interacts with an internally derived feedback signal generated by the feedback network. A feedback signal having a phase which is a function of the sensed reflected wave is applied to the oscillator causing the oscillator to change its operating frequency. The new frequency of the oscillator is retransmitted by the first antenna establishing a new propagated wave wherein the frequency of the radio frequency signal is changed. By measuring the operating frequency shifts of the oscillator with respect to time, an output signal is generated as a function of the Doppler frequency shift attributed to the intercepting target. By means of output sampling devices, an output signal can be produced which is a function of target velocity.

The electrical detecting means of the present invention can be utilized in a pulse controlled radar system for tracking a moving target whereby target velocity and range can be very accurately computed. Such a radar system utilizes the frequency shifts of the oscillator for determining the target velocity. The Doppler effect of the reflected wave is internally derived as the target moves relative to the radar system antenna and a vectored target velocity representation is provided. The target reflected wave is received by a receiving antenna and amplified by a radio frequency signal amplifier. The amplified received signal is applied to a feedback network which ultimately varies the oscillator operating frequency thereby indicating target velocity.

The range or distance of the target is determined by the time interval between transmission of a pulse of radio frequency signal by the antenna and of a reflected pulse from a target received by the antenna.

This radar system provides a substantial improvement over the known radar systems. Known radar systems require expensive and bulkyl delay lines. A pulse controlled radar system based on the teachings of this invention provides a relatively simple and reliable system for tracking moving targets such as, for example, a high speed aircraft or a space capsule.

One advantage of the present invention is to provide an electrical detecting means which indicates detection of an intruding target by shifting the operating frequency of an oscillator.

Another advantage of the present invention is that the velocity of a moving detected target can be determined by incremental changes in oscillator frequency and power.

A further advantage of the electrical detecting apparatus of this invention is that a target capable of producing a reflected radio frequency signal wave can be detected.

An additional advantage of the present invention is that an inexpensive, portable, completely enclosed, single transistor electrical detecting apparatus for sensing presence of an intruding target can be constructed wherein the output signal thereof can be picked up by a remote receiver tuned to the frequency of the detector oscillator.

Yet another advantage of the present invention is that the electrical detecting means can be adapted for use in a pulse controlled radar system for tracking a target in space.

The above and further advantages of this invention will be apparent from the following description of a preferred embodiment and other alternate embodiments with reference to the accompanying drawing wherein.

Briefly, the electrical detecting means of the present invention comprises means including reasonant means for producing a radio frequency signal at a resonant frequency in response to a feedback signal having a predetermined phase. When the phase of the feedback signal is shifted to a phase other than the predetermined phase, the producing means produces a radio frequency signal at a frequency off the resonant frequency. The radio frequency signal produced by the producing means is radiated by radiating means in a propagated wave. Prior to a target intercepting the propagated wave, the feedback means establishes a feedback signal having a first phase to operate the producing means at a first frequency. When a target intercepts the propagated wave, the reflected wave is sensed by a receiving means and the receiving means applies a signal which is a function of the reflected wave to a feedback means. The feedback means changes the phase of the feedback signal to a phase other than the first phase to shift the frequency of the producing means from a first frequency to a second frequency in response to the receiving means detecting a reflected wave from the target intercepting the propagated wave.

Figure 1:
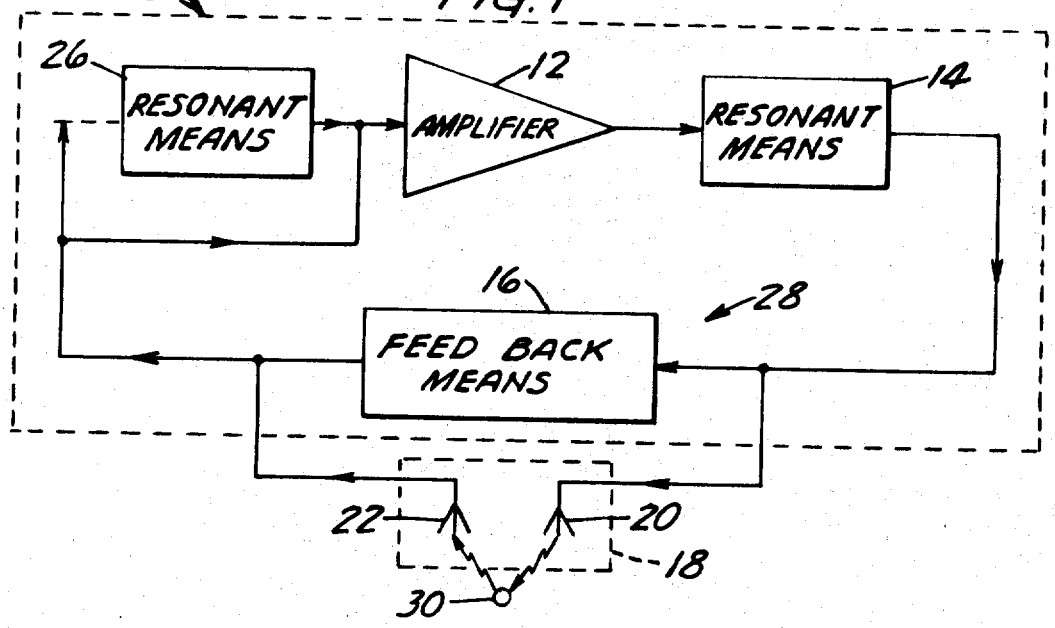
FIGURE 1 is a block diagram illustrating the electrical detecting means of the present invention.

Referring now to the block diagram of FIGURE 1, the electrical detecting means of the present invention includes a means including resonant means for producing a radio frequency signal at a resonant frequency, or an oscillator 10. In one embodiment, oscillator 10 includes an amplifier 12 and a resonant means 14 and an internal feedback means 16. *Resonant means 14 and internal feedback means 16 are shown connected in series to illustrate the functional effect resonant means 14 has on feedback means 16, specifically, to illustrate that means 16 provides feedback throughout a band centered about the resonant frequency of means 14.* An external feedback means 18 having means for radiating a radio frequency signal in a propagated wave and means for receiving a reflected wave, such as for example antennas 20 and 22, are electrically connected in parallel to the internal feedback means 16. Alternately, the oscillator 10 includes an additional or second resonant means 26. The internal feedback means 16 and the external feedback means 18 form a [feedback means on] feedback network 28 capable of producing a feedback signal having a phase dependent upon the signals associated with antennas 20 and 22.

When the feedback network 28 produces a feedback signal having a predetermined phase, the oscillator 10 produces a radio frequency signal having a frequency determined by the resonant frequency of the resonant means 14. However, it is not necessary that the oscillator 10 be operated at the resonant frequency of the resonant means 14. For example, the feedback signal from the feedback network 28 may be at a phase other than the predetermined phase which operates the oscillator at a frequency off the resonant frequency. The radio frequency signal is applied to one of the antennas, for example antenna 20, and antenna 20 radiates the radio frequency signal as a propagated wave. The field pattern of the propagated wave is determined by antenna design and environmental conditions as known in the art.

A target 30, which is to be detected by the electrical detecting means, intercepts the propagated wave of the radio frequency signal and produces a reflected wave which is sensed by the other antenna 22. The antenna 22 upon receiving the reflected wave causes a change in phase of the feedback signal from external feedback means 18. The feedback signal from external feedback means 18 algebraically adds to the feedback signal from the internal feedback means 16 causing a change in phase of the feedback signal from the feedback network 28 being applied to amplifier 12 to oscillator 10. Oscillator 10 immediately responds to the feedback signal change of phase by shifting to a different operating frequency. In this embodiment, the oscillator 10 was assumed to be operating at resonant frequency. Thus, the oscillator operating frequency shifts to a frequency off the resonant frequency. The antenna 20 retransmits the new radio frequency signal being produced by oscillator 10. Subsequent movement of target 30 changes the reflected wave being received by antenna 22. The antenna 22 changes the phase of the feedback signal from the feedback network 28 causing the oscillator 10 to again change its operating frequency.

Figure 2:
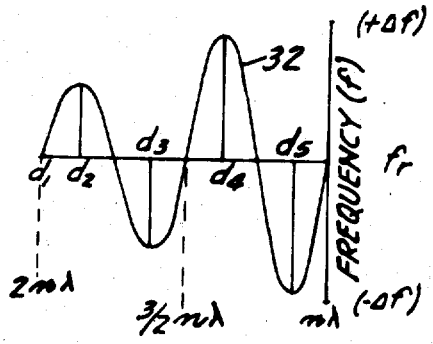
FIGURE 2 is a graph illustrating the frequency deviations of an oscillator, within the electrical detecting means of FIGURE 1, as a function of target distance from a receiving antenna.

As the target 30 intercepts the propagated wave, the oscillator changes frequency as a function of target size and target distance to the receiving antenna. For example, FIGURE 2 is a graph illustrating a waveform 32 produced by plotting the frequency of the oscillator 10 as a function of target distance at a right angle, or 90°, from the antenna 22. The Doppler frequency of the target produces one cycle of signal as the target moves through a distance of $\frac{1}{2}\lambda$ where $\lambda$ is the wavelength of the oscillator frequency. In one experiment, a target moving directly toward the antenna 22 at a 90° angle and at a rate of 30 cm./sec. produced a Doppler frequency signal of 1.5 cycles/sec., which signal increased in amplitude as the target moved closer to antenna 22.

In this embodiment, initially oscillator 10 was selected to operate at a resonant frequency determined by resonant means 14. This frequency is selected by the feedback network 28 producing a feedback signal having a predetermined phase as described. In FIGURE 2, oscillator 10 in the absence of target 30 is operating at frequency $f_r$. This is equivalent to target 30 being at a distance $d_1$ out of range of the antennas 20 and 22. As target 30 approaches, antenna 22 senses a reflected wave returned by the intruding target. The antenna 22 changes the phase of the feedback signal in the external feedback means 18 and subsequently in the feedback network 28. When the target 30 reaches a distance $d_2$ FIGURE 2 from antenna 22, the frequency of oscillator 10 shifts off of the resonant frequency $f_r$ to a $+\Delta f$. As the target 30 moves closer to antenna 22, the target passes through several nodes. For example, as the target 30 approaches antenna 22, say for example from a distance of $2n\lambda$ to $32n\lambda$, the frequency of the oscillator shifts to a frequency of $-\Delta f$. As the target 30 moves through distances $d_3$, $d_4$ and $d_5$, the bandwidth or change in frequency of the oscillator 10 increases while cyclically changing from $+\Delta f$ to $-\Delta f$.

The waveform 32 of FIGURE 2 is plotted by a target 30 moving toward antenna 22 of FIGURE 1 at a uniform velocity. However, if the target 30 stops, say for example at point $d_3$, the frequency of oscillator 10 will stay at the $-\Delta f$ frequency. The Doppler shift frequency would not longer be generated by oscillator 10 but the fact that the oscillator shifted operating frequency from the first frequency f to a second frequency $f-\Delta f$ indicates detection of a target 30.

The above example assumed that the feedback network 28 produces a feedback signal of a predetermined phase and magnitude which fixed the oscillator 10 frequency at a resonant frequency in the absence of a target 30. However, the oscillator 10 can be operated off of resonant frequency in the absence of a target. When a target 30 intercepts the propagated wave, the oscillator frequency can shift to the resonant frequency or to another off resonant frequency. In any event, the oscillator operates at a first frequency determined by a feedback signal at a first phase when the reflected wave is unintercepted and at a second frequency determined by a feedback signal at a second phase when a target 30 intercepts the propagated wave of radio frequency signal at the first frequency.

The second resonant means 26 is employed to provide a wide band impedance match for the internal feedback means 16, the external feedback means 18 and the amplifier 12.

The presence of a target 30, either a moving or a stationary target, is detectable by measuring the frequency shifts of the oscillator with respect to time. An output signal is generated by the electrical detecting means which is the Doppler frequency shift of the oscillator 10 as the target 30 moves relative to the antennas 20 and 22 through the nodes illustrated in FIGURE 2.

The Doppler frequency shift ($\Delta f_D$) is determinable from the following equation:

$$\Delta f_D = \left| f_o \left[ \frac{2V_o}{C_o - V_o} \right] \right|$$

where:

$f_o$=oscillator frequency before propagated wave is intercepted by a target, $V_o$=target velocity (change in distance between target and antenna with respect to time), and $C_o$=velocity of light.

Operation of the electrical sensing device requires that the total loop gain of the amplifier, resonant circuit and feedback circuits be greater than unity to initiate oscillations. Additionally, the phase shift in the feedback circuits must be 360° for the embodiment of FIGURE 1 at the operating frequency. A subsequent change in phase in the feedback circuit results in a change of frequency according to the following equation:

$$\Delta\phi = 2Q_L \frac{2\pi\Delta f}{2\pi f}$$

where:

$\Delta\phi$=change in phase, $Q_L$=loaded "Q" of resonant means 14, and f=frequency.

Since the total phase shift in the feedback circuits seeks to stabilize at 360° after a change in phase represented by $\Delta\phi$, the corresponding change in the oscillator frequency is determinable per the above equation. Further, since the change in oscillator frequency is determinable, the change in input power $\Delta p$ is also readily predictable. Thus, the electrical detecting apparatus operating characteristics can be monitored either by sensing the $\Delta f$ or $\Delta p$ of the oscillator 10.

Figure 3:
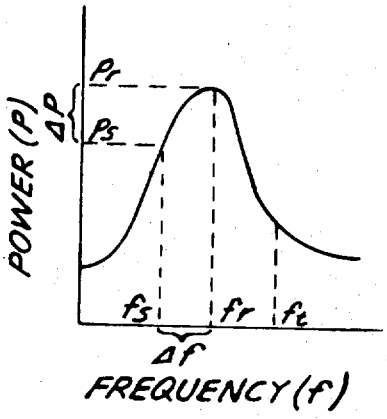
FIGURE 3 is a graph illustrating the relationship between input power and frequency for an oscillator utilized in the electrical detecting means of FIGURE 1.

Referring now to FIGURE 3, the graph depicts the response curve of the oscillator 10. The response curve is produced by plotting oscillator input power (p) as a function of oscillator frequency (f). When the feedback network 28 produces a feedback signal having a predetermined phase, the oscillator 10 produces a radio frequency signal at a frequency determined by the resonant frequency of the resonant means 14. The resonant frequency is depicted on the graph of FIGURE 3 as $f_r$ and is located at the peak power point of the response curve. The input power to the oscillator 10 at resonant frequency is maximum and is depicted as point $p_r$ on FIGURE 3.

When a target 30 intercepts the propagated wave and produces a reflected wave, a feedback signal having a certain phase from external feedback means 18 is superimposed upon the feedback signal having a certain magnitude and phase from internal feedback means 16. Thus, the phase of the feedback signal from feedback network 28 is an algebraic sum of the two feedback signals from feedback means 16 and 18. The feedback signal from feedback network 28 is applied to the resonant means 26. If the target 30 is not an exact integer of $\frac{1}{2}\lambda$ or wavelengths from the radiating and receiving means of external feedback means 18 when the reflected wave is sensed, the phase of the propagated wave from antenna 20 will be different from the phase of the feedback signal applied to the resonant means 14 from the feedback network 28. When this occurs, the oscillator 10 changes its operating characteristics to shift its operating frequency until the phase of the propagated wave is in phase with that of the feedback signal from feedback network 28.

As an example, it can be assumed that the oscillator 10 is originally operating at resonant frequency determined by the resonant means 14. The oscillator 10 responds to the change of phase of the feedback signal by shifting its frequency of operation to a frequency other than the resonant frequency. The second or new frequency is depicted as point $f_s$ on the waveform of FIGURE 3. The change of frequency between $f_r$ and $f_s$ is denoted as $\Delta f$ and the new frequency $f_s$ is off of resonant frequency. Since $f_s$ is off of resonant frequency, the input power to oscillator 10 is immediately decreased as depicted by point $p_s$ in the waveform of FIGURE 2. The change in power of the oscillator 10 between the power level $p_r$ and $p_s$ is denoted as $\Delta p$.

When a target 30 intercepts the propagated wave established by the radiating and receiving means of the external feedback means 18, both the frequency and input power of oscillator 10 change in value due to the phase shift in the feedback signal. The $\Delta f$ and $\Delta p$ resulting from the change in phase of the feedback signal is representative of a target being detected and the magnitude thereof is representative of the magnitude of the phase shift.

The magnitude of the phase shift is a function of several variables such as the distance between the target and antennas, the integer number of half wavelengths between the target distance and the size of the target. As the target 30 moves through the wave field established by the propagated wave, the frequency operating point on the graph of FIGURE 3 will vary first to one side of the initial frequency, for example to point $f_s$, then from $f_s$ back to $f_r$ as the target 30 moves closer to the radiating and receiving means of the external feedback means 18 and then to the other side of the graph to a frequency $f_t$ and then back again through the frequency $f_r$. The discussion of FIGURE 2 indicated that the sweep of frequency as the target moved closer to the antennas not only increased in absolute value but varied between a $-\Delta f$ and a $+\Delta f$ depending on the integer number of half wavelengths the target 30 is away from the antennas. Thus, a moving target produces discrete values of $\Delta f$ and $\Delta p$ as illustrated in FIGURE 3 each of which vary in magnitude as a function of time and the velocity of target 30.

The electrical detecting means of FIGURE 1 can be used in an embodiment where the radiation pattern is a closed field. For example, some known object such as a wall, a tree or the like can intercept the propagated wave from antenna 20 and cause a reflected wave to be received by antenna 22 in the absence of a target 30. When a target 30 intercepts the propagated wave, the antenna 22 detects the presence of target 30 by sensing or detecting a change in phase of the reflected wave. In the absence of a target 30, the feedback network 28 produces a first feedback signal having a phase determined by the reflected wave received by antenna 22. An intruding target 30 causes the reflected wave change in phase and thereby changes the phase of the feedback signal from the feedback network 28 to the second phase. The change in phase of the feedback signal from feedback network 28 causes the oscillator 10 to shift its operating frequency from a first frequency to a second frequency.

The electrical sensing means of FIGURE 1 has utility as a moving object detector and the like. For example, an electrical sensing apparatus could be used as a burglar or intruder sensing device. The apparatus would be located in a building or area to be secured and connected into an electrical circuit whereby an alarm would be sounded or some other indicator actuated when the frequency of the oscillator shifts indicating that a burglar or some other unauthorized person or object has entered the radiation field in the area or building being protected.

Since the Doppler frequency is at a fairly low cycles per second, this gives the electrical sensing apparatus of the present invention a desirable inherent characteristic. The wavelength of the oscillator frequency is such that variations in reflected wave phases due to moving known objects in a building under surveillance, such as for example vibrating furnace duct work, metal blinds, slight wall vibration and the like, will not cause spurious signals.

Figure 4:
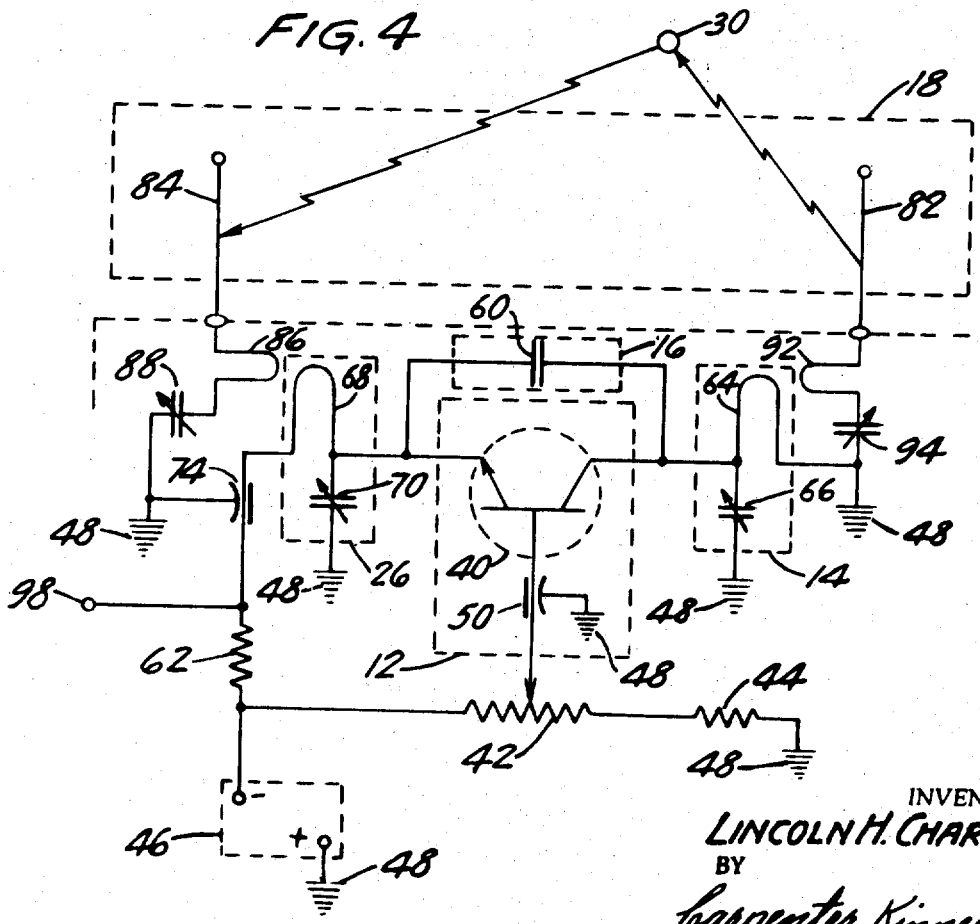
FIGURE 4 is a schematic diagram illustrating one embodiment of the present invention utilizing a single transistor oscillator-detector connected in a common base configuration.

FIGURE 4 is a schematic diagram of a single transistor circuit which can be used as an electrical detecting means. In this embodiment, an NPN transistor 40, connected as common base amplifier, is utilized as the amplifier 12. A voltage dividing network comprising a variable resistor 42 and a resistor 44 are connected between a power source 46 which may be, for example, a negative D.C. potential and a ground 48. The base of transistor 40 is electrically connected to the variable resistor 42 such that a preselected bias voltage can be applied between the emitter and base of transistor 40. The base of transistor 40 is electrically connected via a feedthrough capacitor 50 to ground 48.

The collector of transistor 40 is electrically connected to the resonant means 14. The resonant means 14 includes an inductor 64, formed by a thin strip of material formed in a loop, and a variable capacitor 66.

The emitter of transistor 40 is connected to a circuit which forms the second resonant means 26. In particular, the emitter of transistor 40 is connected to a loop inductor 68, which inductor 68 has a variable capacitor 70 connected between inductor 68 and ground 48 forming the resonant means 26. A resistor 62, electrically connected between the power source 46 and the inductor 68, establishes the proper bias voltage for the emitter of transistor 40.

A capacitor 60 is electrically connected between the emitter and collector of transistor 40 and functions as the internal feedback means 16. Capacitor 60 establishes a first *or internal* feedback signal for transistor 40. The transistor 40, resonant means 14 and 26 and capacitor 60 form the oscillator generally referred to as oscillator 10 in FIGURE 1.

The radiating and receiving means of the external feedback means 18 is formed from a pair of axially aligned dipole antennas 82 and 84. The first dipole antenna 82 is inductively coupled to the resonant means 14 by a loop inductor 92 and a variable capacitor 94. The second dipole antenna 84 is inductively coupled to the resonant means 26 by means of loop inductor 86 and a variable capacitor 88. The radio frequency signal generated by transistor 40 is induced on the antenna 82 via loop inductors 64 and 92 while antenna 84 couples the received signal to the transistor 40 via loop inductors 68 and 86. A feed-through capacitor 74 electrically connects one lead of the inductor 68 to ground 48.

Transistor 40 is driven into oscillation by [a] *the internal* feedback signal which is impressed onto the emitter of transistor 40 by means of capacitor 60. The phase of the feedback signal impressed onto transistor 40 is preset to a predetermined phase by means of changing the value of capacitor 60. In the absence of a target 30 intercepting the propagated wave being radiated by the antenna 82, the transistor 40 will be driven into oscillation at a frequency which is equal to the resonant frequency of inductor 64 and capacitor 66. The signal impressed onto inductor 92 is applied to antenna 82. Antenna 82 radiates the radio frequency signal in a propagated wave, which in this embodiment, is a continuous wave. Thus, antenna 82 radiates a radiation field of radio frequency signals at a first frequency which is determined by the first phase of the feedback signal.

When a target 30 intercepts the radiated propagated wave from antenna 82, the target 30 reflects the intercepted wave back to the antenna 84. The signal sensed by antenna 84 is applied as a radio frequency signal voltage, the magnitude of which is determined by the reflected wave, across loop inductor 86 and capacitor 88. The radio frequency voltage impressed across the series connected inductors and capacitor of antenna 84 produces [a] *an external* feedback signal which is coupled to the emitter of transistor 40 via inductor 68. The [resulting] *resultant* feedback signal impressed onto the emitter of transistor 40 is a combination of the feedback signals produced from the capacitor 60 and the antenna 84 and is changing in phase as a function of the target's reflected waves. A *resultant* feedback signal having a new phase causes the transistor 40 to shift its operating frequency to a second frequency which is determined by the phase of the feedback signal. The radio frequency signal having a frequency which is equal to the second frequency is then induced onto the antenna 82 by means of an inductive coupling between inductors 64 and 92. Antenna 82 them radiates the radio frequency signal at the second frequency in the form of a propagated wave.

Phase correction of the feedback signal at the emitter of transistor 40 is obtained by shifting the operating frequency to a frequency where the resultant phase of the feedback signal is made equal to the phase of the feedback signal before target 30 intercepts the propagated wave.

As the target 30 changes position, the antenna 84 produces a feedback signal having a different phase which will then be superimposed onto the feedback signal from capacitor 60 to again change the frequency of operation of transistor 40. In this embodiment, as target 30 moves relative to antennas 82 and 84, the change of phase of the feedback signal supplied via antenna 84, inductors 86 and 68 to the emitter of transistor 40 is time related.

An output signal from the electrical detecting means can be obtained by connecting an output terminal 98 between the resistor 62 and feed-through capacitor 74. The frequency of the output signal plotted as a function of distance is a sine wave which is the Doppler function of target velocity. Both the oscillator operating frequency and the input power thereto changes as a function of the detected target rate of movement.

In one embodiment of FIG. 4, the following components were utilized:

| Component: | Value |
|---|---|
| Tansistor **40** | RCA40235. |
| Resistor **42** | 5000Ω. |
| Resistor **44** | 4000Ω. |
| Power source **46** | 10 v. D.C. |
| Resistor **62** | 270Ω. |
| Capacitors **50, 74** | 1500 pf. |
| Capacitors **66, 70, 88, 94** | .2–4.5 μμf. |
| Capacitor **60** | 1 pf. (intrinsic). |
| Inductors **64, 68** | ½ turn of silver strip .75" x .125" x .007". |
| Inductors **86, 92** | Straight silver strip .50" x .125" x .007" |
| Antennas **82, 84** | 4"—14 gauge silver wire. |

Characteristics

| | |
|---|---|
| Frenquency range | .55–1 gHz. |
| Radiated power | 50–100 μw. |
| Coverage | 50 foot circle. |

Figure 5:
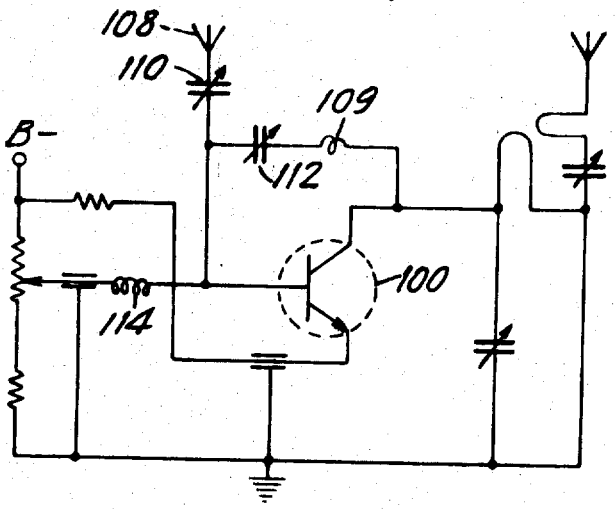
FIGURE 5 is a schematic diagram illustrating another embodiment of the present invention utilizing a single transistor oscillator-detector connected in a common-emitter configuration.

FIGURE 5 is a schematic diagram of another embodiment of an electrical detecing apparatus wherein a single NPN transistor 100 is utilized as the amplifier 12, which transistor 100 is connected in a common emitter configuration. The circuit of FIGURE 5 differs from that of FIGURE 4 in that the receiving antenna, designated as 108, is directly connected to the transistor 100 via variable coupling capacitor 110. A variable capacitor 112 and inductor 109 function as the internal feedback means for establishing the internal feedback portion of the feedback signal. Inductor 114 is a radio frequency choke used for isolating the base lead of transistor 100 from ground.

Figure 6:
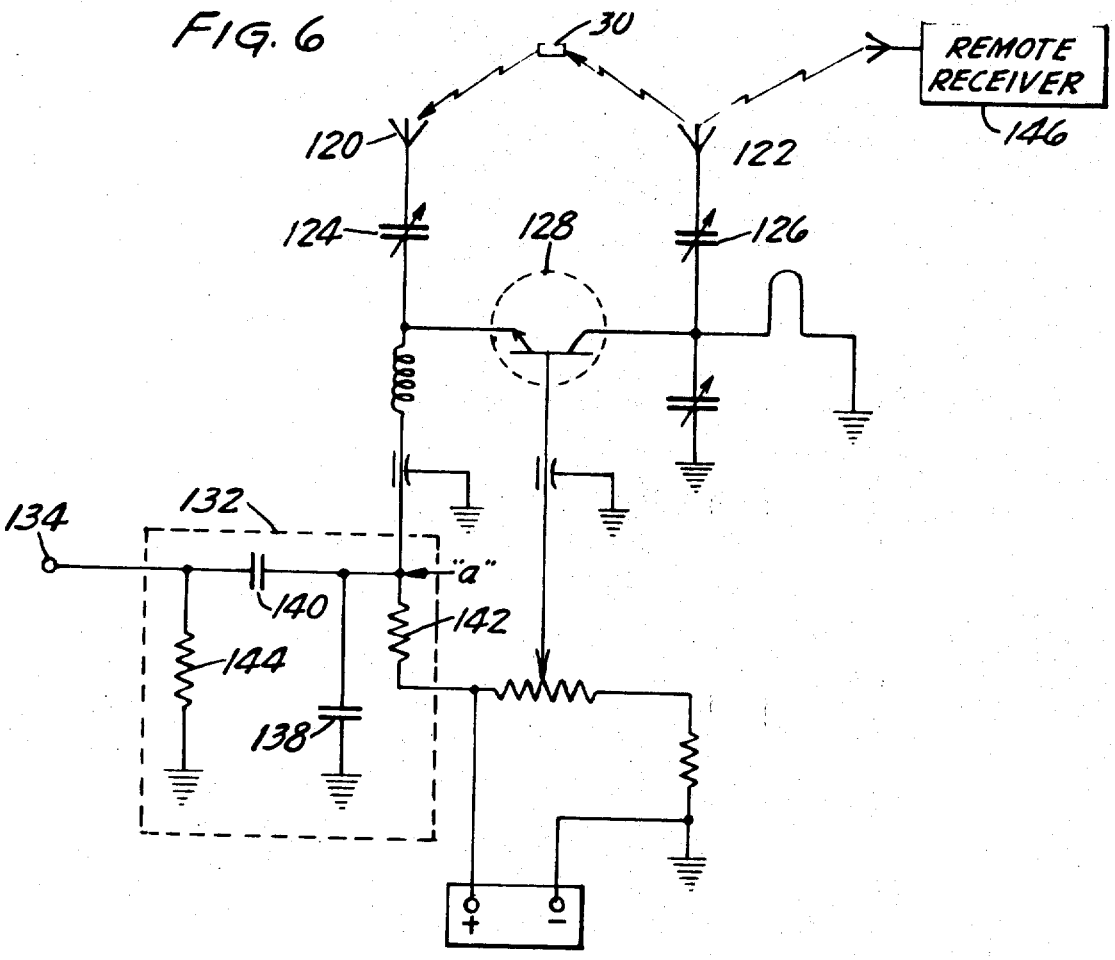
FIGURE 6 is a schematic diagram of yet another embodiment of the present invention having an output sampling means for producing an output signal having pulse period modulation.

FIGURE 6 is yet another embodiment of an electrical detecting means of this invention. The circuit of FIGURE 6 differs from the circuits of FIGURES 4 and 5 in that both antennas 120 and 122 are directly connected via capacitors 124 and 126 respectively to an NPN transistor 128 connected in a common base configuration.

Figure 7A:
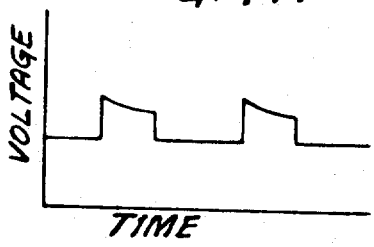
FIGURES 7A and 7B are graphs illustrating waveforms at two terminal points in the embodiment of FIGURE 6.
Figure 7B:
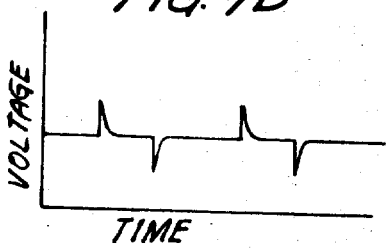

FIGURE 6 also includes therein an output sampling means 132 which is connected to the frequency producing means or oscillator which includes the transistor 128. The oscillator is periodically disabled by the output sampling means 132 for a predetermined time interval determined by the producing means. The output sampling means 132 converts the sine wave, which varies in frequency as a Doppler function of target velocity, into an output signal appearing on an output terminal 134 having pulse period modulation. This enables the electrical detecting means to operate as before, except that the power requirements of the power source can be substantially reduced. The output sampling means 132 includes a capacitor 138, a capacitor 140 and resistors 142 and 144. Capacitor 138 is operatively connected between ground and the emitter of transistor 128. A resistor-capacitor charging circuit comprising capacitor 138 and resistor 142 produces an output signal at terminal point "a." A plot of the voltage versus time of the output signal at terminalpoint "a" is illustrated as the waveform in the graph of FIGURE 7A. Capacitor 140 and resistor 144 receive and differentiate the waveform illustrated in FIGURE 7A producing an output signal having pulse period modulation. A plot of the differentiated output signal appearing at output terminal 134 is a waveform illustrated in the graph of FIGURE 7B.

The antenna 122 radiates the radio frequency signal at a frequency determined by the operation of the oscillator. Thus, by means of a remote receiver 146, the radiated radio frequency signal can be sensed without a physical connection to the device. When a target 30 intercepts the propagated wave from the antenna 122 and produces a reflected wave, the output signal from the output sampling means 132 and the radio frequency signal received by the remote receiver 146 concurrently either increase or decrease as a function of target movement. A change of pulse rate when detected by the remote receiver 146 indicates a moving target 30 intercepting the propagated radio frequency signal radiated by antenna 122.

The pulse period modulation output signal from the output sampling means 132 or the demodulated signal from the remote receiver 146 can be processed through a double integrator circuit to recover the sine wave which is a direct function of the Doppler frequency shift attributed to the target 30.

The electrical detecting means of the present invention can be adapted as a pulse controlled radar system for detecting the range, velocity and direction of a moving target.

Figure 8:
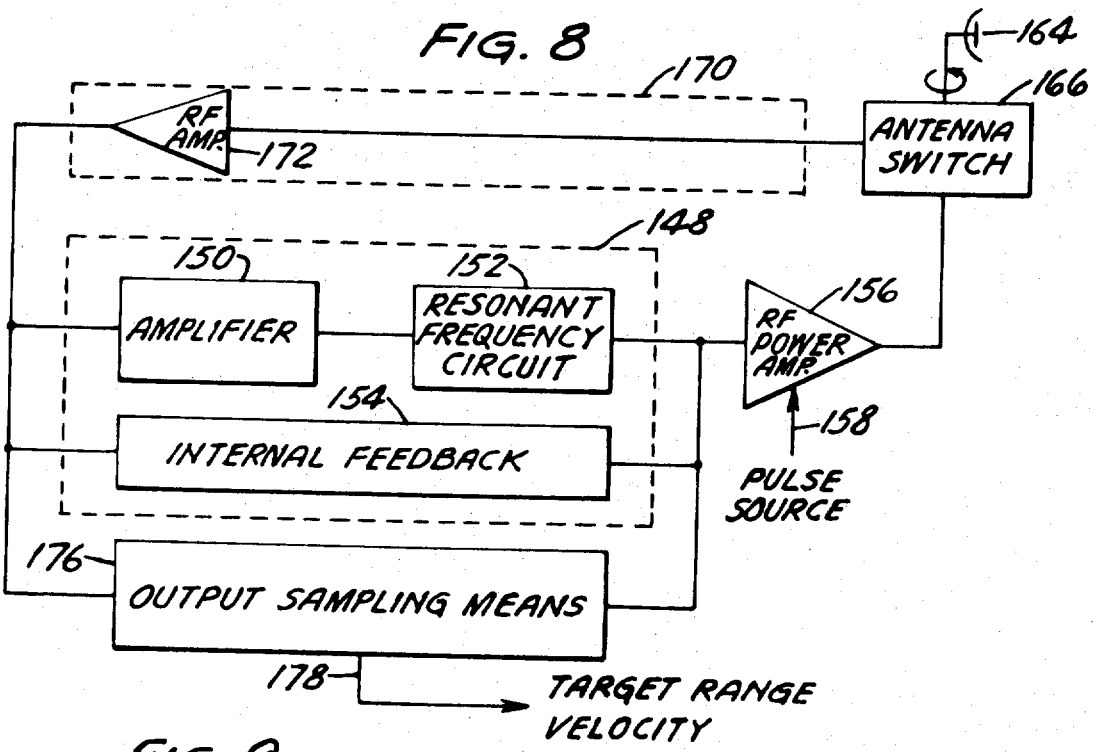
FIGURE 8 is a block diagram of a pulse controlled radar system utilizing the present invention.

One embodiment of such a pulse controlled radar system is illustrated in FIGURE 8. The radar system includes an oscillator 148 which includes an amplifier 150. a resonant frequency circuit 152 and a feedback circuit 154. The oscillator 148 produces a radio frequency signal at the resonant frequency of circuit 152 when a feedback signal is applied thereto having a predetermined phase. The oscillator 148 produces a radio frequency signal at a frequency which is off the resonant frequency when the feedback signal being applied thereto has a time related phase shift wherein the particular phase of the feedback signal is at a phase other than the predetermined phase.

A first *or internal* feedback signal is generated by a first feedback circuit or internal feedback circuit 154. The output from the oscillator 148 is applied to a radio frequency pulse controlled amplifiier 156. The amplifier 156 is controlled by means of control pulses which are applied to an input 158 from a pulse source (not shown).

A rotatable directional antenna 164 is adapted to be connected to the radio frequency amplifier 156 via an automatically controlled antenna switch 166. Antenna switch 166 is adapted to have two positions which are sequenced automatically. When switch 166 is in its first or transmit position, an amplified radio frequency signal pulse from amplifier 156 is passed to antenna 164 whereupon the amplified radio frequency signal pulse is radiated in a propagated wave. Immediately after the antenna 164 transmits a pulse, the antenna switch 166 automatically transfers to its second or receive position. In the event a target 30 intercepts the transmitted radio frequency pulse, a reflected radio frequency signal pulse will be returned and sensed by the antenna 164. The antenna switch 166 automatically returns back to its first or transmit position in sufficient time to transmit a subsequent radio frequency pulse.

When the antenna switch 166 is in its second or receive position, the radar system can receive a reflected pulse of radio frequency signal indicating a target. When a moving target intercepts a radio frequency signal pulse transmitted by the antenna 164, a reflected pulse is returned by the target to the antenna 164. The antenna 164 applies the received pulse to the oscillator 148 via antenna switch 166 and amplifier 172 to a second feedback circuit 170.

The second feedback circuit 170 produces a second *or external* feedback signal which is amplified by amplifier 172 and superimposed on the first feedback signal produced by the internal feedback circuit 154. The resultant feedback signal having a phase determined by the algebraic sum of the two feedback signals, is applied to oscillator 148 causing the oscillator to change operating frequency and input power as a function of a detected moving target.

An output sampling means 176 is adapted to be connected to the oscillator 148 for converting the shifts in oscillator operating frequency $\Delta f$ into target velocity. The output sampling means 176 is capable of converting the time interval between the time a radio frequency signal pulse was transmitted by the antenna 164 and the time the antenna 164 received a target reflected radio frequency pulse into target range and direction, the direction being determined from the direction of the rotatable directional antenna. The parameters of the detected target, such as the range, velocity and direction, are produced as an electrical signal on output 178.

Figure 9:
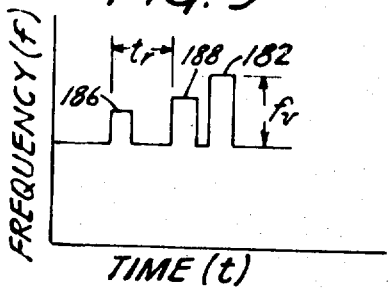
FIGURE 9 is a graph illustrating a waveform of the output signal from the pulse controlled radar system of FIGURE 8.

The signal appearing at output 178 is in the form of a pulse train varying wherein the pulses having uniform time duration vary in frequency and in time intervals therebetween. The graph of FIGURE 9 depicts a waveform of the output signal. The waveform is produced by plotting the frequency (f) as a function of time (t). The uniform time duration of each pulse is determined by the control pulses applied to amplifier 156 from the pulse source via pulse input 158.

Referring to the waveform of FIGURE 9, frequency of oscillator 148 is denoted as $f_v$ on one output pulse 182. The change in frequency $\Delta f$ of the pulses represents target velocity.

The interval between pulses, such as for example the time interval between the leading edges of pulses 186 and 188, is represented by $t_r$. The time interval $t_r$ is used to represent target range or distance. The direction of target movement is a function of the angular rotation $\Theta$ of antenna 164 and the $\Delta\Theta$ between pulses is used for target direction.

The above embodiments of the electrical detecting means of this invention are not intended to limit the scope of the present invention. It is contemplated that any and all modifications, uses, equivalents and the like are within the scope of the appended claims.

What is claimed is:

1. Electrical detecting means comprising:

means including resonant means for producing a radio frequency signal at a resonant frequency in response to a feedback signal having a predetermined phase and for producing said radio frequency signal at a frequency off said resonant frequency when said feedback signal has a phase other than said predetermined phase;

means for radiating said radio frequency signal in a propagated wave and for receiving a reflected wave when a target intercepts said propagated wave; and feedback means operatively connected to said producing means and said receiving means for establishing said feedback signal having a frequency which is determined by the frequency of said producing means at a first phase to operate said producing means at a first frequency when said propagated wave is unintercepted by said target and for changing the phase of said feedback signal to a phase other than said first phase to shift the frequency of said producing means and said feedback signal from said first frequency to a second frequency in response to said receiving means detecting a reflected wave from said target intercepting said propagated wave.

2. The electrical detecting means of claim 1 wherein said [means for radiating said radio frequency signal in a] propagated wave is intercepted by a known object and a reflected wave from this object is received by said receiving means whereby a radiation pattern in the absense of a target is established, said receiving means being responsive to a target intercepting said radiation pattern by detecting a change in phase of said reflected wave, said feedback means being responsive to said receiving means detecting said phase change to shift the frequency of said producing means from said first frequency established by a feedback signal in the absence of said target but in the presence of said object to a second frequency in response to said receiving means detecting said phase change when said target intercepts said radiation pattern.

3. The electrical detecting means of claim 1 wherein said resonant means is a resonant circuit and said feedback signal first phase is said predetermined phase whereby said producing means produces a radio frequency signal at a frequency determined by the resonant frequency of said circuit and said producing means shifts to a frequency off said resonant frequency when said feedback signal is shifted to a phase other than said first phase.

4. The electrical detecting means of claim 1 further including:

output sampling means connected to said producing means for passing as an output signal a sine wave which varies in frequency as a Doppler function of target velocity and which is generated by said producing means shifting frequency as said receiving means receives reflected waves from said target.

5. The electrical detecting means of claim 1 further including:

output sampling means operatively connected to said producing means for disabling said producing means operation in predetermined time intervals determined by said producing means for converting a sine wave which varies in frequency as a Doppler function of target velocity into an output signal having pulse period modulation.

6. An electrical detecting apparatus comprising:

an oscillator including a resonant frequency circuit for producing a radio frequency signal at the resonant frequency of said circuit in response to a *resultant* feedback signal having a predetermined phase, said oscillator producing said radio frequency signal at a frequency off said resonant frequency when said *resultant* feedback signal has a phase other than said predetermined phase;

a first antenna adapted to be operatively coupled to said oscillator for radiating said radio frequency signal in a propagated wave;

a second antenna adapted to be operatively coupled to said oscillator for receiving a reflected wave returned by a target intercepting said propagated wave [; and] *and for producing an external feedback signal in response to said reflected wave; and*

[a feedback network connected between said oscillator and said first and second antennas for establishing said feedback signal at a frequency substantially equal to the frequency of said oscillator, said feedback network including means for establishing a first feedback signal having a first phase to operate said oscillator at a first frequency and means for establishing a second feedback signal in response to said second antenna detecting a reflected wave, said second antenna upon detecting a reflected wave from said target being responsive to a change in phase of said second feedback signal as a function of the change in phase of said reflected wave as said target moves relative to said second antenna, said second feedback signal being superimposed on said first feedback signal to apply to said oscillator a feedback signal having] *internal feedback means in said oscillator including means for establishing an internal feedback signal and including means for*

*superimposing said external feedback signal on said internal feedback signal to form said resultant feedback signal, which resultant feedback signal has* a changing phase for shifting the operating frequency of said oscillator as said target moves relative to said second antenna, said shift in oscillator frequency producing a sine wave output signal having a frequency which varies as the Doppler function of target velocity.

7. The electrical retecting apparatus of claim 6 wherein said resonant frequency circuit is a resonant inductive-capacitive circuit.

8. The apparatus of claim 6 wherein said first and second antennas are in axial alignment.

9. The apparatus of claim 8 further including:

impedance matching means connected between said first and second antennas and *the remainder of* said feedback network for adjusting each antenna impedance.

10. The apparatus of claim 6 further including:

an output signal sampling device connected to said oscillator for disabling said oscillator for predetermined time intervals determined by said producing means for converting said sine wave, which varies in frequency as a Doppler function of target velocity, into an output signal having pulse period modulation.

11. The electrical detecting apparatus of claim 10 further comprising:

a remote receiver tuned to the operating frequency of said oscillator for receiving the propagated radio frequency signal having pulse period modulation whereby said oscillator operation can be monitored remotely to detect a moving target.

12. A radar system comprising:

means including resonant circuit means capable of producing a radio frequency signal at the resonant frequency of said circuit and at a frequency off said resonant frequency in response to a change of signal phase;

internal feedback means electrically connected to said radio frequency signal producing means for establishing the frequency of said producing means at a first frequency; and external feedback means including means for radiating a propagated wave of radio frequency signal into space and for receiving a reflected wave when said propagated wave is intercepted in space by a target, said external feedback means being electrically connected in parallel relationship with said internal feedback means and adapted to produce a change of phase signal across said internal feedback means in response to a change [of phase] *in the difference* between the phase of a reflected wave and the phase of the propagated wave, said internal feedback means being responsive to said external feedback means for applying said change of phase to said [oscillator] *radio frequency signal producing means* causing said [oscillator] *radio frequency signal producing means* to change from said first frequency to a second frequency whereby target detection is indicated by the frequency difference between said first and second frequency.

13. A pulse controlled radar system for detecting the range, velocity and direction of a moving target comprising:

an oscillator including a resonant frequency circuit for producing a radio frequency signal at a resonant frequency of said resonant circuit in response to a feedback signal having a predetermined phase, said oscillator producing said radio frequency signal at a frequency off said resonant frequency in response to said feedback signal having a time related phase wherein the phase thereof is at other than said predetermined phase;

a first feedback circuit connected in parallel relationship to said oscillator for establishing a first feedback signal having a first phase to operate said oscillator at a first frequency;

a pulse controlled amplifier operatively connected to receive a continuous radio frequency signal from said oscillator for producing pulses of radio frequency signal having ap redetermined duration, said amplifier being adapted to be operated in response to control pulses from a pulse source;

a rotatable directional antenna adapted to be operably connected to said amplifier for radiating said pulses in a propagated wave and receiving reflected pulses of radio frequency signal returned by a target intercepting said propagated wave of detecting pulses;

a second feedback circuit capable of producing a second feedback signal and adapted to be connected between said antenna and said oscillator, said second feedback circuit including a radio frequency signal amplifier for amplifying reflected pulses received by said antenna from a target intercepting said detecting pulses for producing said second feedback signal having a time related phase, said second feedback signal being superimposed on said first feedback signal and applied to said oscillator, said oscillator being responsive to said time related phase to shift from said first frequency to a second frequency;

an antenna switching means operatively connected to said antenna and adapted to be connected separately to said pulse controlled amplifier and said radio frequency signal amplifier, said antenna switching means being connected to said pulse controlled amplifier for passing said detecting pulses to said antenna for the duration of each detecting pulse, said antenna switching means being capable of switching and passing a reflected pulse to said amplifier during the interval between detecting pulses; and output sampling means adapted to be connected across said oscillator for converting the oscillator frequency shift between said first frequency and said second frequency into target velocity, the time interval between the time said antenna transmits a detecting pulse and the time a reflected pulse is detected by said antenna into target range, and target direction is determined from the direction of said rotatable directional antenna.

14. An electrical detecting means for sensing the presence of a target in a predetermined area comprising:

means for producing a radio signal at a frequency at which maximum energy is transmitted in response to a *resultant* feedback signal having a predetermined phase and for [producing] *changing the frequency of* said radio signal [at a first] *to a* frequency [off the] *other than the frequency* of maximum energy transfer [frequency] when the *resultant* feedback signal has a phase other than said predetermined phase;

means operatively coupled to said producing means for radiating [a] *said* radio signal [at a first frequency] in a progagated wave into said predetermined area;

*internal* feedback means operatively connected with said radiating means, for producing a *first* feedback signal *shifted in* [having a] phase *from the phase* [which established the frequency] of said radio signal [; and ];

means including receiving means operatively connected to said *internal* feedback means for receiving a reflected wave of said propagated wave returned by said target and for providing a phase changing feedback signal in response to said reflected wave and superimposing said phase changing signal on said *first* feedback signal *to form said resultant feedback signal* [produced by said feedback means, said feedback means responding to said phase changing signal received from said receiving means for producing a feedback signal having a frequency determined by said producing means] for shifting the frequency of said producing means to a frequency other than said first frequency in response to a change in phase of said reflected wave.

15. The electrical detecting means of claim 14 further comprising:

means operatively coupled to said producing means for detecting said deviations in said frequency for providing an output signal which varies in proportion to said frequency deviations.

*16. Electrical detecting apparatus comprising:*

*a feedback oscillator for producing a radio frequency signal;*

*means for radiating the radio frequency signal in a propagated wave; and*

*means for receiving a reflected wave of the radio frequency signal when an object intercepts the propagated wave and for applying an electrical signal representative of the reflected wave to the oscilaltor feedback path whereby a change in the phase of the signal representative of the reflected wave produces a corresponding change in the frequency of the propagated wave of radio freqency signal produced by the radio frequency oscillator to cause the frequency of the propagated wave to vary when a moving object is intercepting the propagated wave.*

References Cited

The following references, cited by the Examiner, are of record in the patented file of this patent or the original patent.

UNITED STATES PATENTS

| | | | |
|---|---|---|---|
| 2,400,309 | 5/1946 | Kock | 343—7.5 |
| 2,424,263 | 7/1947 | Woodyard | 343—7.5X |
| 2,913,716 | 11/1959 | Powell | 343—7 |
| 3,088,111 | 4/1963 | Davies | 343—7.5X |
| 3,289,204 | 11/1966 | Murray et al. | 343—7.5 |

RODNEY D. BENNETT, Jr., Primary Examiner

T. H. TUBBESING, Assistant Examiner

U.S. Cl. X.R.

343—7.7; 340—258

UNITED STATES PATENT OFFICE

CERTIFICATE OF CORRECTION

Patent No. Reissue 27064 Dated February 16, 1971

Inventor(s) Lincoln H. Charlot, Jr.

It is certified that error appears in the above-identified patent and that said Letters Patent are hereby corrected as shown below:

Col. 3, line 3, change the work "bulkyl" to -- bulky --;

Col. 5, line 24, change "32n " to -- 3/2n --;

Col. 5, line 34, change "not" to -- no --;

Col. 8, line 71, change "them" to -- then --;

Col. 9, line 42, change "detecing" to -- detecting --;

Col. 10, line 37, change "." to -- , --;

Col. 13, line 10, change "retecting" to -- detecting --;

Col. 14, line 8, change "ap redetermined" to -- a predetermined --.

Signed and sealed this 10th day of August 1971.

(SEAL)
Attest:

EDWARD M.FLETCHER,JR.
Attesting Officer

WILLIAM E. SCHUYLER, JR.
Commissioner of Patents